C. N. BROWN.
Machines for Gumming Saws.
No. 135,769. Patented Feb. 11, 1873.
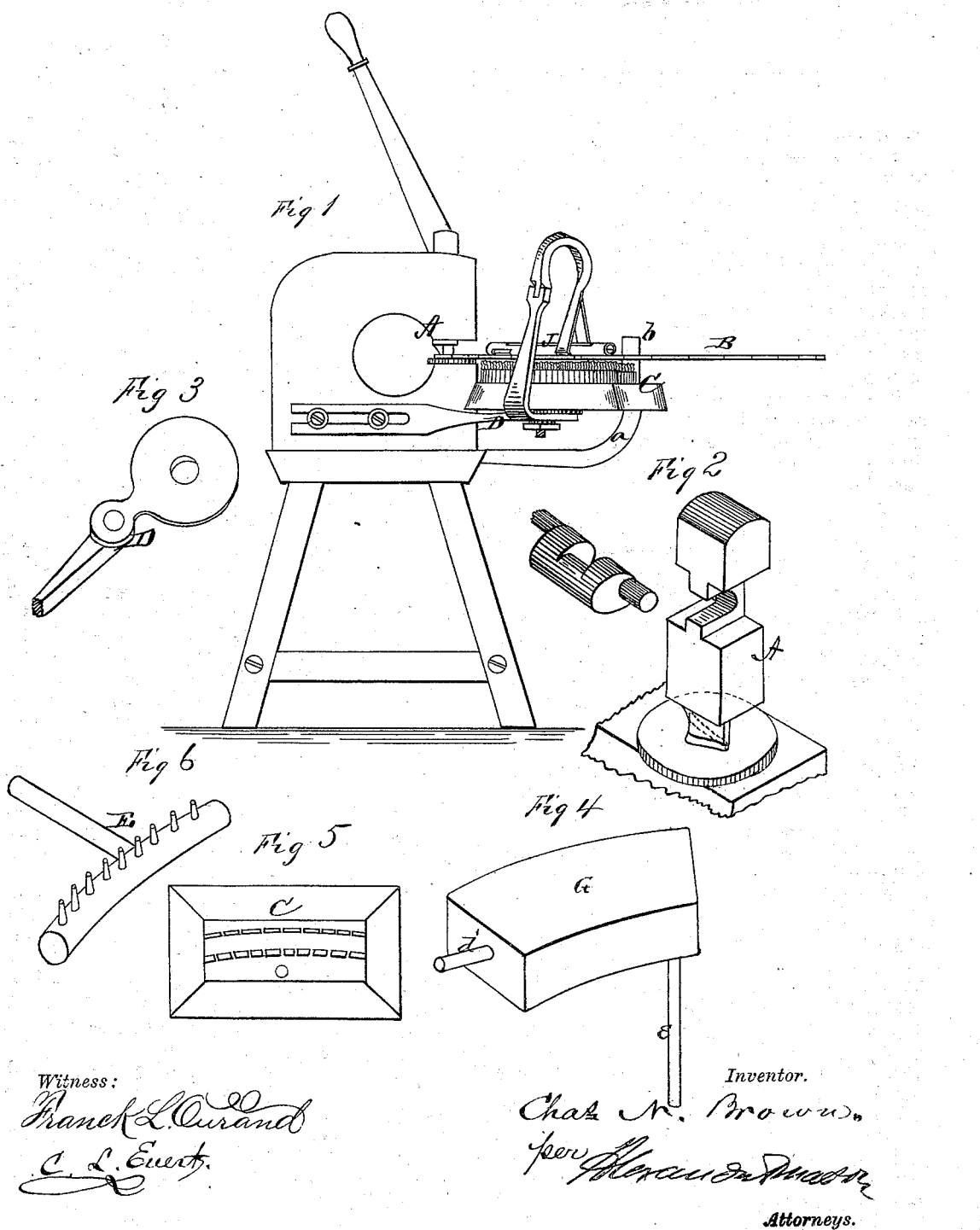

UNITED STATES PATENT OFFICE.

CHARLES N. BROWN, OF PROVIDENCE, RHODE ISLAND.

IMPROVEMENT IN MACHINES FOR GUMMING SAWS.

Specification forming part of Letters Patent No. 135,769, dated February 11, 1873.

*To all whom it may concern:*

Be it known that I, CHARLES N. BROWN, of Providence, in the county of Providence, and in the State of Rhode Island, have invented certain new and useful Improvements in Process and Apparatus for Cutting and Gumming Saws; and do hereby declare that the following is a full, clear, and exact description thereof, reference being had to the accompanying drawing and to the letters of reference marked thereon making a part of this specification.

It is a fact well known to saw-makers and saw-operators that much difficulty is experienced in cutting or gumming saws by the ordinary means of a die and plunger. Untempered saws are often rent while cutting the incisions for inserting teeth, seriously damaging the plates; and in recutting or gumming saws of a heavy gage often one or more of the teeth are broken out or a serious rend made in the plate; and the damage to such a saw is not easily estimated nor willingly sustained by any party. Saw-makers have therefore adopted the rule to gum saws only at the owners' risk. The risks are so great that many feel compelled to work their saws at great disadvantage with short or ill-shapen teeth, or expend files, time, and much hard labor to do that which should be accomplished with ease and dispatch by successful appliances for the purpose.

My invention is intended to overcome all these difficulties, and facilitate the hitherto difficult and perplexing task of recutting hardened saws, rendering the same easy.

The nature of my invention consists in the application of artificial heat to the parts to be cut or gummed, thereby rendering them elastic, and obviating all danger and liability of rending or breaking the saw. It also consists in the use of a thermometer in combination with the heating apparatus, whereby the temperature of the saw is known and the work performed with safety.

In order to enable others skilled in the art to which my invention appertains to make and use the same, I will now proceed to describe the manner and the means by which the same is performed, reference being had to the accompanying drawing, in which—

Figure 1 is a side elevation of a punch or gumming machine with a saw and heating-lamp attached, showing the application of my invention; Figs. 2 and 3 show detached parts of the same; and Figs. 4, 5, and 6 show various means for heating the same.

A represents a hand-punch or gumming-machine, to which the saw B is attached, and secured in its proper location by the arm $a$ and stud $b$. C is a heating-lamp sustained by the adjustable, hinged, or jointed arm D, and located under the edge of the saw in such a position that the flame from each burner will act most efficiently in heating that portion of the saw which is to be cut, and should be made with a sufficient number of burners (according to the oil or fluid used) to heat as rapidly as may be desired to turn or move the saw in cutting or gumming.

In Fig. 5 I have shown a convenient lamp for this purpose, the burners being arranged in two concentric curves. The number of burners also depends upon the size of the saws.

Where gas is convenient a device, E, shown in Fig. 6, may be used, the burners in the same being proportioned according to the work desired to be performed; or a steam or hot-air box, G, may be used, the steam or hot-air entering at the side through the pipe $d'$, and escaping at bottom through the pipe $e$.

If none of the above-named appliances can be obtained the saw may be heated in any ordinary manner before placing upon the machine, and the beneficial results will be in proportion to the heat retained in the saw while being cut or gummed.

Any degree of artificial heat will lessen the tendency of the plate to rend or break while being cut, but the limits of perfect safety are found to be from 150° to 350° Fahrenheit, according to the degree of hardness of the saw-plate, and the temper of the saw will in nowise be injured by heating to this temperature.

J represents a thermometer secured to the heating apparatus by the hinged arm K allowing it to rest upon that part of the saw which is heated, thus showing the temperature at which the saw may be cut with safety.

Having thus fully described my invention, what I claim as new, and desire to secure by Letters Patent, is—

1. The employment of artificial heat to render saw-plates and saws elastic before being cut or gummed, in the manner and for the purposes herein set forth.

2. The combination of a lamp or other heating device with a saw and punch or gumming-machine, for the purpose set forth.

3. The application of a thermometer to a saw-plate at the time of heating, substantially as described, and for the purposes set forth.

In testimony that I claim the foregoing I have hereunto set my hand this 21st day of September, 1872.

CHARLES N. BROWN.

Witnesses:
 CHARLES SELDEN,
 HENRY MARTIN.